Patented Nov. 1, 1938

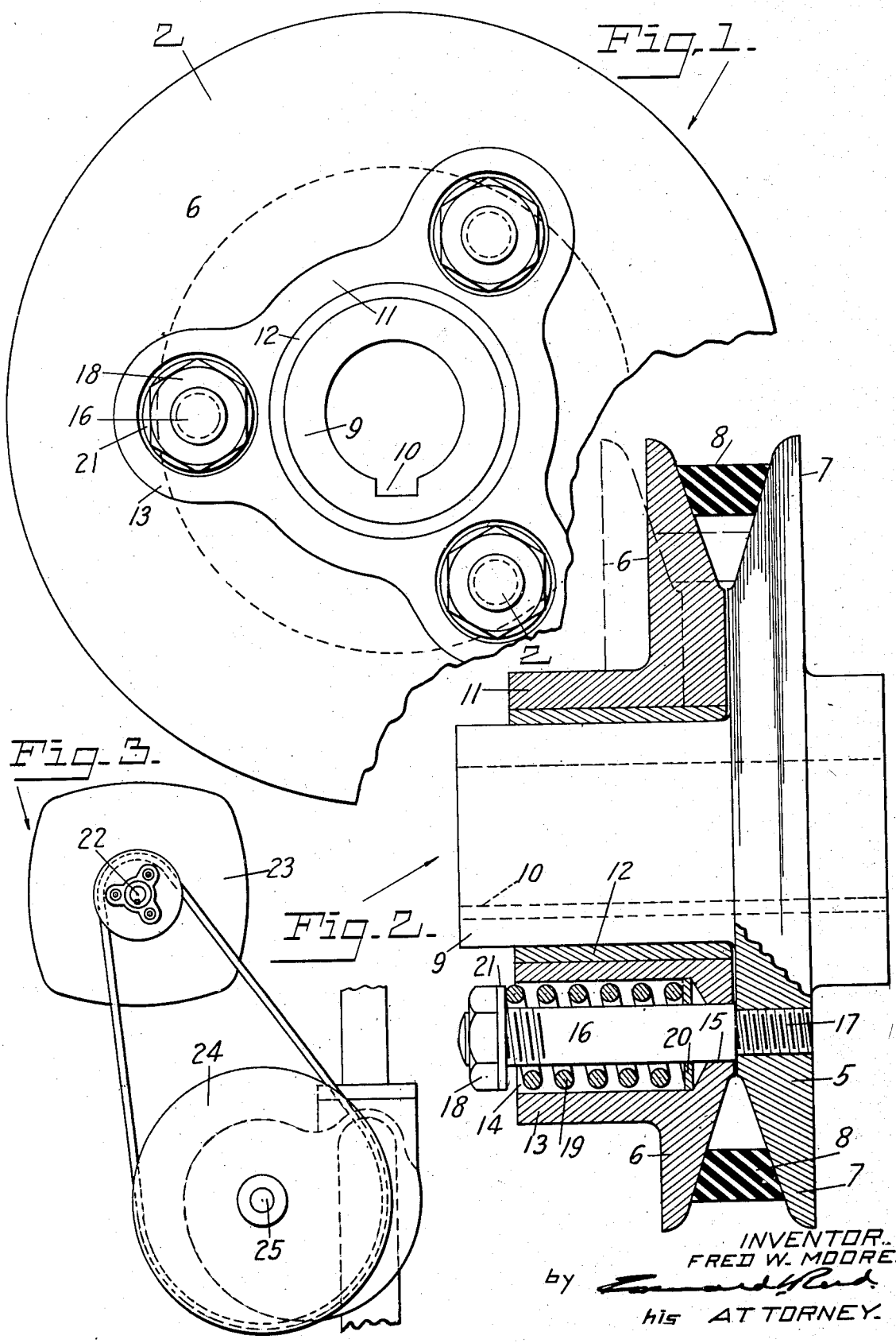

2,135,214

UNITED STATES PATENT OFFICE 2,135,214

SELF-ADJUSTING PULLEY

Fred W. Moore, Dayton, Ohio, assignor to National Pumps Corporation, Dayton, Ohio, a corporation of Ohio Application September 13, 1937, Serial No. 163,614

1 Claim. (Cl. 74—230.17)

This invention relates to a self-adjusting pulley and one object of the invention is to provide a pulley having a V-shaped groove which will automatically adjust itself in accordance with any increase in the width of the belt to maintain a constant effective diameter of the pulley and which will automatically adjust itself to reduce the effective diameter of the pulley under excessive load so as to reduce the load on the motor which drives the pulley.

In various installations, such as a motor driven gasoline pump, it is common practice to provide the motor, or other source of power, with a driving pulley having a V-shaped groove adapted to receive a belt which tapers in cross section, and is commonly called a V-belt, which belt connects the same with the driven pulley. When such an installation is subjected to atmospheric moisture the belt will sometimes swell so as to increase its width and cause the same to creep outwardly in the pulley groove and thereby increase the effective diameter of the pulley and the load imposed upon the motor. Further, in such an installation when the motor is started it must overcome the inertia of the pump or other driven device and this imposes on the motor a temporary increased load which is objectionable.

A further object of the invention is to provide a pulley which will be automatically adjustable to vary the width of the groove in accordance with any variation in the width or length of the belt and to vary the width of the groove under an excessive load to permit the belt to move toward the axis of the pulley and thereby decrease the effective diameter of the latter and reduce the load on the motor.

A further object of the invention is to provide such a pulley which will be very simple in its construction, which will comprise but a few parts and will have these parts of such a character and so arranged that they will not materially increase the size of the pulley or project beyond the same to an objectionable extent.

Other objects of the invention may appear as the pulley is described in detail.

In the accompanying drawing Fig. 1 is a front elevation, partly broken away, of a pulley embodying my invention; Fig. 2 is a sectional view taken on the line 2—2 of Fig. 1; and Fig. 3 is an elevation of a belt driven installation embodying my adjustable pulley.

As shown in that embodiment illustrated in the drawing the pulley comprises two disks 5 and 6 arranged face to face for rotation in unison about a common axis. The adjacent peripheral portions of the two disks are beveled to provide between the same a substantially V-shaped groove 7 adapted to receive a belt 8 which is tapered in cross section. The disk 5 is adapted to be rigidly mounted on the shaft so as to be held against all movement with relation thereto and, in the present construction, it is provided with an elongated hub 9 having a keyway 10 to receive a key to secure the same to the shaft. This elongate hub has its outer surface finished to provide a bearing for the disk 6 and this disk, 6, is also provided with an elongate hub 11 which is slidably mounted on the hub 9 of the disk 5 so that it may have movement toward and from the disk 5. If desired, a self-lubricating bushing or liner 12 may be interposed between the two hubs to facilitate the relative movement thereof. The disk 6 is provided with a plurality of enlargements or bosses 13 spaced about the hub 11 thereof and provided with cavities which form pockets 14. At its inner end each cavity is provided with a reduced portion 15 which opens through the inner face of the disk. Mounted in each pocket is a stud 16 which extends through the opening 15 and is rigidly secured to the stationary disk 5, as by screw threading the end of the stud into the disk 5, as shown at 17. At its outer end the stud is screw threaded to receive a nut 18 which forms an adjustable stop. Confined between the stop 18 and the inner end of the pocket is a spring 19 which is preferably coiled about the stud. In the present instance a washer 20 is interposed between the spring and the inner end of the pocket 14 and a washer 21 is interposed between the spring and the stop or nut 18. The springs are so spaced about the axis of the disk 6 as to exert substantially uniform pressure on all parts of that disk and, together with the elongate bearing provided between the two disks, to prevent any tilting or binding of the disk 6 and provide for the free movement thereof by or against the action of the springs.

In Fig. 3 I have shown the pulley as included in a belt driven installation, such as is commonly employed in a motor driven gasoline pump. As there shown, the pulley is mounted on the shaft 22 of an electric motor 23 and is connected by the belt 8 with a driven pulley 24 which is secured to the shaft 25 of the pump or other part to be driven. When the motor is operating under normal load and the belt 8 is of normal width the springs will hold the slidable disk 6 in contact with the stationary disk 5 and the effective diameter of the pulley will be determined wholly by the normal width of the belt.

It will be understood that the studs 16 hold the two disks against relative rotation. If the belt swells so as to increase its width it would tend to creep outwardly in the V-shaped groove and thus increase the effective diameter of the pulley but the driven pulley, which is non-expansible, will prevent the outward creeping of the belt in the groove of the driving pulley and consequently the swelling of the belt will force the disk 6 outwardly against the action of the springs 19, thereby increasing the width of the groove to permit the belt to operate therein at the same radial distance from the axis of the pulley and preventing any increase in the load on the driving pulley. Where the driven pulley is provided with a V-groove of fixed width the swelling of the belt may cause it to creep outwardly in this groove and draw the belt inwardly a slight distance in the groove of the driving pulley but this will decrease the effective diameter of the driving pulley and the load on the motor and is not seriously objectionable. When an excessive load is imposed upon the motor, as during the starting operation, the increased pull on the belt will move the same inwardly and thereby force the slidable disk 6 outwardly against the action of the springs, thus reducing the effective diameter of the pulley and reducing the load on the motor. As soon as the pump or other load is in full operation and the load on the motor has become normal the action of the springs on the disk 6 will force the belt outwardly to its normal position, thus restoring the normal effective diameter of the pulley.

It will be noted that the only increase in the size of the self-adjusting pulley over the size of a similar non-adjusting pulley resides in the bosses 13 and these do not objectionably increase the size of the pulley. The only projecting parts are the ends of the studs 16 and their nuts 18 but these lie close to the ends of the bosses 13 and the hub 11 and are not objectionable.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

A self-adjusting pulley comprising opposed disks having their adjacent peripheral portions beveled to provide the pulley with a substantially V-shaped groove, one of said disks having an elongated hub and the second disk having a hub projecting a substantial distance beyond the outer side thereof and slidably mounted on the first mentioned hub, said second disk having a plurality of bosses extending therefrom to points adjacent the outer end of its hub and also having openings extending therethrough and through the respective bosses, the outer portions of said openings being of relatively large size to form pockets, studs secured to the first mentioned disk and extending through said openings, each stud having at its outer end a part forming a stop, and springs mounted within said pockets and confined between the inner ends thereof and the respective stops.

FRED W. MOORE.